(12) United States Patent
Matsumoto

(10) Patent No.: US 11,204,632 B2
(45) Date of Patent: *Dec. 21, 2021

(54) ELECTRONIC DEVICE AND METHOD FOR CONTROLLING THE SAME

(71) Applicant: CANON KABUSHIKI KAISHA, Tokyo (JP)

(72) Inventor: Akihiro Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/023,096

(22) Filed: Sep. 16, 2020

(65) Prior Publication Data

US 2021/0004069 A1    Jan. 7, 2021

Related U.S. Application Data

(63) Continuation of application No. 15/654,567, filed on Jul. 19, 2017, now Pat. No. 10,809,781.

(30) Foreign Application Priority Data

Jul. 25, 2016  (JP) .................................. 2016-145604

(51) Int. Cl.
*G06F 1/26* (2006.01)
*G06F 1/3203* (2019.01)
(Continued)

(52) U.S. Cl.
CPC .............. *G06F 1/26* (2013.01); *G06F 1/3203* (2013.01); *G06F 1/324* (2013.01); *G06F 1/3209* (2013.01);
(Continued)

(58) Field of Classification Search
CPC ...... G06F 1/3268; G06F 1/266; G06F 1/3203; G06F 1/3275; G06F 1/3287; G06F 1/3221; G06F 1/3225; G06F 1/3253; G06F 1/3256; G06F 1/3281; G06F 1/3284; G06F 2213/0032; G06F 3/0601; G06F 3/0625; G06F 3/0688; G06F 3/1221; G06F 3/1229; G06F 3/1285; Y02D 10/154;
(Continued)

(56) References Cited

U.S. PATENT DOCUMENTS

2011/0010573 A1    1/2011    Igari

FOREIGN PATENT DOCUMENTS

CN    101872289 A    10/2010
CN    103303006 A    9/2013

*Primary Examiner* — Phil K Nguyen
*Assistant Examiner* — Brian J Corcoran
(74) *Attorney, Agent, or Firm* — Canon U.S.A., Inc. I.P. Division

(57) ABSTRACT

The present disclosure provides an electronic device including a main controller and a communication controller configured to communicate with the main controller and a device through a predetermined physical communication interface based on a predetermined communication standard. The communication controller instructs power-off of the predetermined physical communication interface and the device when an event which causes transition to a power saving state occurs in the main controller, and determines whether the predetermined physical communication interface is to be returned from the power saving state without power-on of the device or with power-on of the device when an event which causes return from the power saving state occurs in the main controller.

12 Claims, 14 Drawing Sheets

(51) Int. Cl.
  *G06F 1/3209*    (2019.01)
  *G06F 1/3287*    (2019.01)
  *G06F 1/3215*    (2019.01)
  *G06F 1/3237*    (2019.01)
  *G06F 1/324*     (2019.01)
  *G06F 1/3234*    (2019.01)
  *G05B 19/042*    (2006.01)

(52) U.S. Cl.
  CPC .......... *G06F 1/3215* (2013.01); *G06F 1/3237* (2013.01); *G06F 1/3284* (2013.01); *G06F 1/3287* (2013.01); *G05B 19/042* (2013.01); *G05B 2219/25291* (2013.01); *Y02D 10/00* (2018.01); *Y02D 30/50* (2020.08)

(58) Field of Classification Search
  CPC ...... Y02D 50/20; Y02D 10/13; Y02D 10/159; Y02D 10/171
  See application file for complete search history.

FIG. 5

| EXTENDED COMMAND NAME | CMD NUMBER | TRANSFER TYPE | DESIGNATION |
|---|---|---|---|
| SetupPowerConfig | 01h | PO | POWER SAVING MODES PS0/PS1/PS2<br>- POWER SAVING STATE OF H-Host-IF<br>- POWER SAVING STATE OF B-Host1-IF AND POWER SAVING STATE OF DEVICE MAIN BODY CONNECTED TO B-Host1-IF<br>- POWER SAVING STATE OF B-HOST2-IF AND POWER SAVING STATE OF DEVICE MAIN BODY CONNECTED TO B-Host2-IF |
| ToSleep | 02h | ND | NOTIFICATION INDICATING THAT UPPER-LEVEL POWER STATE ENTERS "Sleep" STATE |
| ToDeep | 03h | ND | NOTIFICATION INDICATING THAT UPPER-LEVEL POWER STATE ENTERS "Deep" STATE |
| GetStatus | 04h | PI | OBTAIN STATUS OF SATA BRIDGE CONTROLLER |

ELECTRONIC DEVICE AND METHOD FOR CONTROLLING THE SAME

CROSS-REFERENCE TO RELATED APPLICATIONS

The present application is a continuation of U.S. patent application Ser. No. 15/654,567, filed on Jul. 19, 2017, which claims priority from Japanese Patent Application No. 2016-145604 filed Jul. 25, 2016, which are hereby incorporated by reference herein in their entireties.

BACKGROUND

Field

The present disclosure relates to an electronic device and a method for controlling the electronic device.

Description of the Related Art

In recent years, environmental regulations of various countries have been tightened year after year to address environmental issues such as global warming.
Printing apparatuses are no exception in that environmental issues are seriously addressed and positive responses to various energy-related rules are required. Furthermore, as mobile electric devices, such as laptop personal computers (PCs) and tablet PCs, have become widely used, driving such devices with battery power is required to be performed for longer periods of time. Therefore, in PCIe (PCI Express) which is a standard of an internal bus interface (IF) and Serial ATA (SATA) which is a standard of an IF with a storage device, a power saving state is designed in a standard specification. For example, in SATA, a power saving state between a host and an inter-device IF is added in addition to a general power saving system command. As examples of the general power saving system command, a Standby command and a Sleep command are defined, and as examples of the power saving state between a host and an inter-device IF, Partial, Slumber, and Device-Sleep (hereinafter referred to as "DevSleep") are defined. Examples of storage devices include a hard disk device (hereinafter referred to as an "HDD") and a solid state drive (SSD). DevSleep indicates a power saving state particularly set to an SSD and is capable of reducing SATA-IF power and main body power in RunTime.

A SATA-IF and a storage device connected to the SATA-IF consumes comparatively large standby power in an idling state in a period other than an access period. This occurs, in particular, in a case where redundant array of inexpensive disk (RAID) control and a data encryption process are performed as a SATA bridge configuration. In this case, standby power in a SATA main controller on a host side and a CPU system of a SATA bridge controller, a plurality of storage devices, and a plurality of SATA-IFs for connecting the plurality of storage devices on a device side, is large. Therefore, power saving control in run time is required. For example, a method using an upper-level main CPU in the SATA bridge configuration serving as a bridge between an HDD having a parallel ATA-IF (PATA-IF) and a SATA host controller having a SATA-IF has been proposed. According to Japanese Patent Laid-Open No. 2005-78514, a SATA-IF between a SATA host controller and a SATA bridge controller on a device side is brought into a power saving state, such as Partial or Slumber, in accordance with a power saving control state of an HDD (a power saving system command to the SATA bridge controller).

In Japanese Patent Laid-Open No. 2005-78514, a SATA system power saving transition process is performed using a power saving system command to an HDD as a base point. Specifically, as a power saving transition condition, a determination is made as to whether power saving transition is to be performed only in a portion of a SATA system while the condition is not related to a power state of an entire device, and therefore, detailed power saving control is restricted.

SUMMARY

Various embodiments of the present disclosure provide an electronic device including a main controller and a communication controller configured to communicate with the main controller and a device through a predetermined physical communication interface based on a predetermined communication standard. The communication controller instructs power-off of the predetermined physical communication interface and the device when an event which causes transition to a power saving state occurs in the main controller, and determines whether the predetermined physical communication interface is to be returned from the power saving state without power-on of the device or with power-on of the device when an event which causes return from the power saving state occurs in the main controller.

Further features of the present disclosure will become apparent from the following description of exemplary embodiments with reference to the attached drawings.

BRIEF DESCRIPTION OF THE DRAWINGS

FIG. 5 is a diagram illustrating extended commands relating to power saving control according to one embodiment.

DESCRIPTION OF THE EMBODIMENTS

Figure 1:
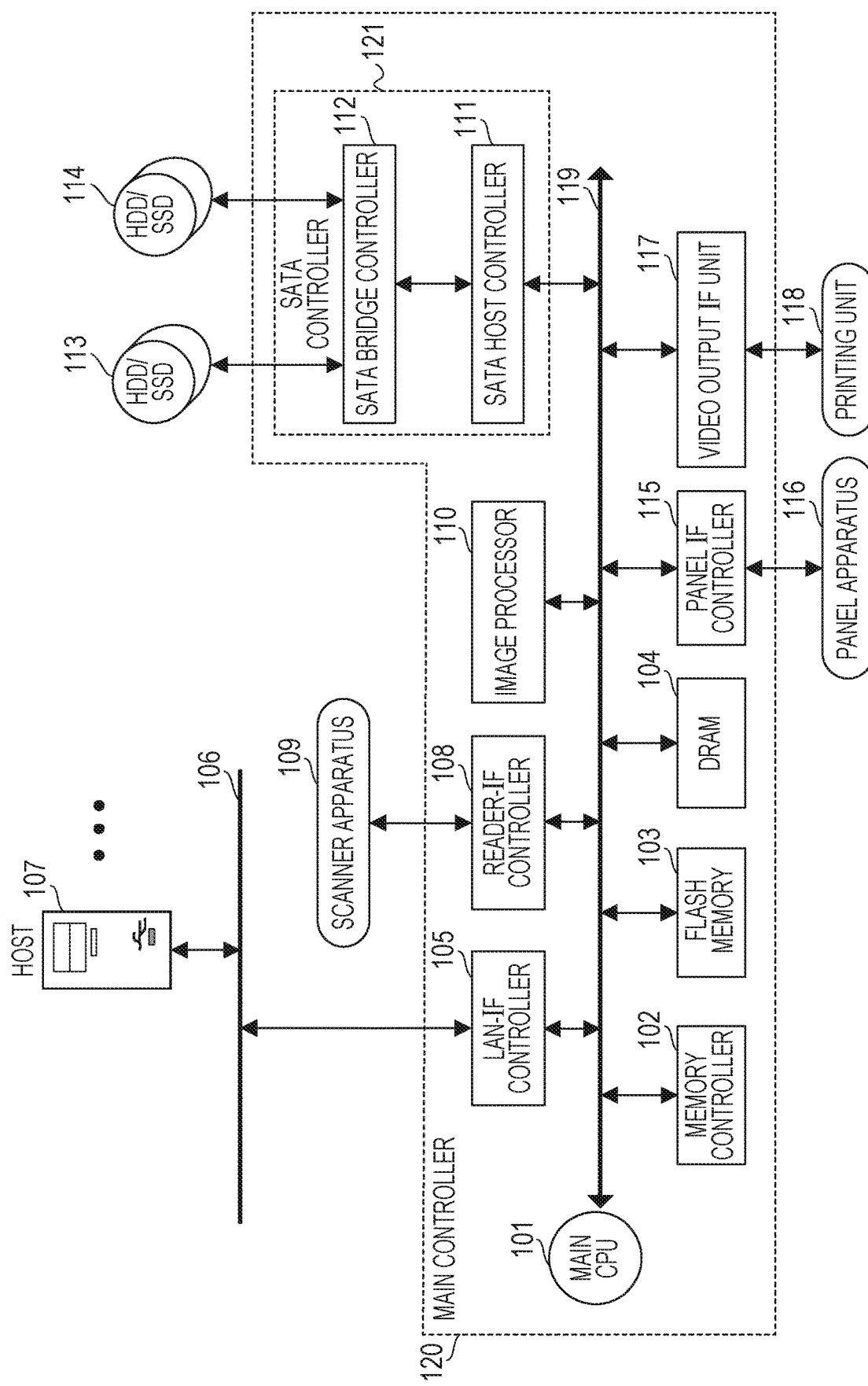
FIG. 1 is a diagram illustrating a configuration of a printing system according to one embodiment.

FIG. 1 is a diagram illustrating a configuration of a printing system according to an embodiment of the present disclosure. The printing system includes a printing apparatus and an external host computer 107. The printing apparatus includes a main controller 120, a scanner apparatus 109, HDD/SSDs 113 and 114, a panel apparatus 116, and a printing unit 118. The printing apparatus is an electronic device. The printing apparatus will be described hereinafter as an example of an electronic device. A main central processing unit (CPU) 101 serving as a main controller performs system control and various calculation processes. A memory controller 102 performs input/output control on various memory devices and direct memory access (DMA) control. A flash memory 103 which is a rewritable nonvolatile memory stores control programs, control parameters, and the like for the entire system. A dynamic random access memory (DRAM) 104 is a volatile memory dedicated for rewriting, such as a double-data-rate (DDR) memory. The DRAM 104 is used as a program work area, a region for storing printing data, a region for storing various table information, and the like. Note that the relationships between the memory controller 102 and the various memory devices are simply described in this embodiment, and the memory controller 102 and the various memory devices are generally controlled in an independent manner. A LAN-IF controller 105 performs input/output control between the LAN-IF controller 105 and a local area network 106 connected to the printing apparatus. The LAN-IF controller 105 generally conforms to the transmission control protocol/Internet protocol (TCP/IP). The LAN-IF controller 105 is connected to a network supporting device, such as the external host computer 107, through a network cable and is capable of performing printing through a network. A reader-IF controller 108 controls communication with the scanner apparatus 109. The printing apparatus realizes a copy function by printing input image data scanned by the scanner apparatus 109. An image processor 110 performs various image processes on image data obtained through the LAN-IF controller 105 and the reader-IF controller 108. A SATA host controller 111 performs data input/output control with a device having an IF based on a serial advanced technology attachment (SATA) standard. A SATA bridge controller 112 is connected to the SATA host controller 111 as a device on an upstream side and has a plurality of host IFs on a downstream side connected to the HDD/SSDs 113 and 114. The SATA bridge controller 112 has functions as added values, such as RAID control and data encryption. A SATA controller 121 is a communication control unit including the SATA host controller 111 and the SATA bridge controller 112 and communicates with the main CPU 101 and the HDD/SSDs 113 and 114 through predetermined physical communication interfaces based on a predetermined communication standard. The predetermined communication standard is a SATA standard, for example. In this embodiment, it is disclosed that the SATA host controller 111 and the SATA bridge controller 112 are independently mounted on the main controller 120 as application specific integrated circuits (ASICs). The panel IF controller 115 controls communication with the panel apparatus 116. The panel apparatus 116 may check various settings and various states of the printing apparatus by operating a liquid crystal screen display, buttons, and the like, serving as user interfaces (UIs) on a panel. A video output IF unit 117 controls communication of a command and a state with the printing unit 118 and transfers printing data to the printing unit 118. The printing unit 118 includes a printing apparatus body, a sheet feeding system, and a sheet discharging system and print printing data on a sheet mainly in accordance with command information supplied from the video output IF unit 117. A main bus 119 includes a bus controller, and collectively indicates a control bus, a data bus, and local buses between arbitrary blocks for descriptive purpose. Examples of the main bus 119 include internal buses of PCI Express (PCIe) and ASIC.

Figure 2:
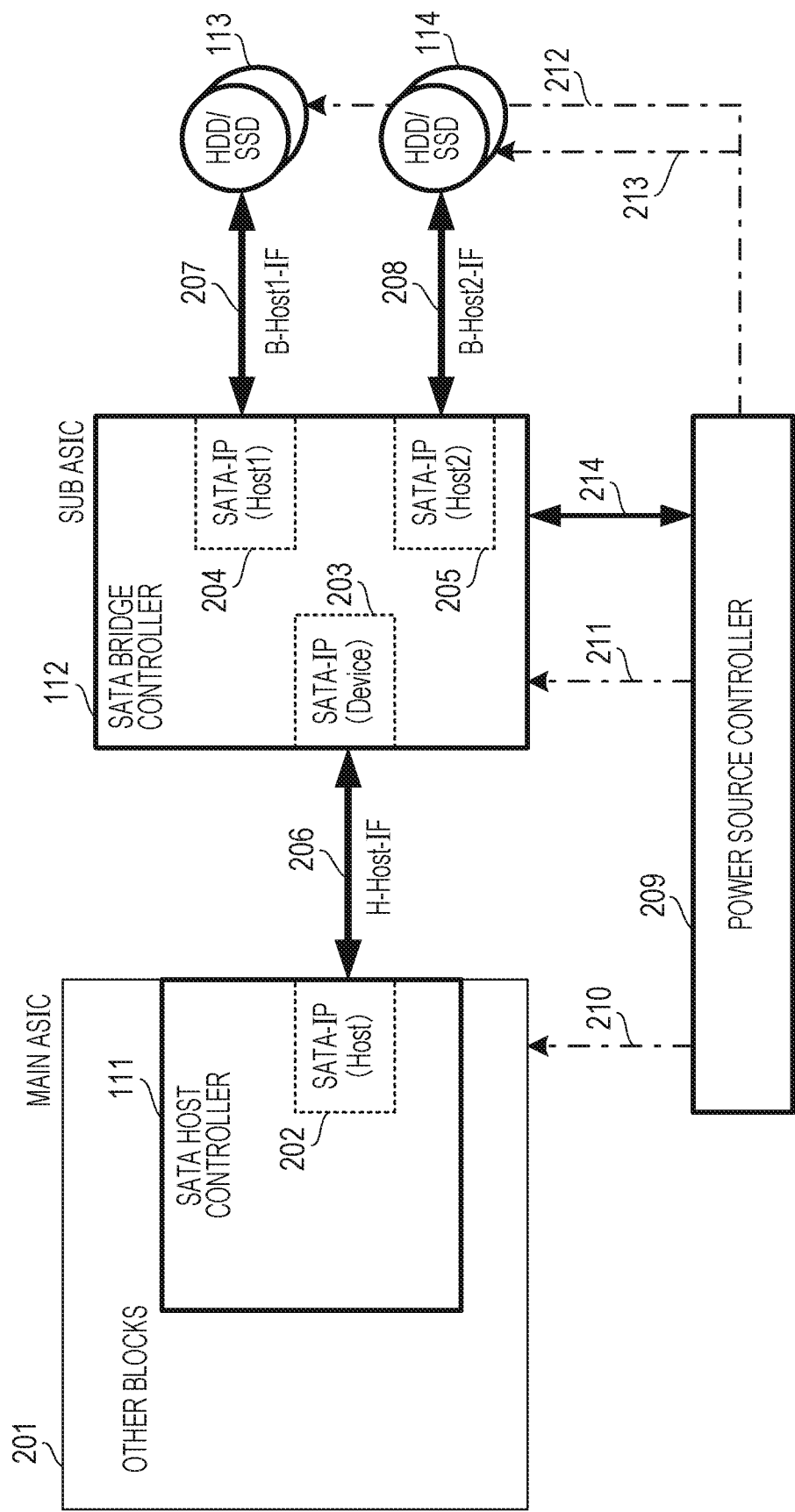
FIG. 2 is a diagram illustrating connections in a SATA bridge configuration according to one embodiment.

FIG. 2 is a diagram illustrating connections in a SATA bridge configuration. A main ASIC 201 is a hub ASIC which controls an entire system of the main controller 120 including the SATA host controller 111. The SATA host controller 111 includes single SATA intellectual property (SATA-IP) 202 as a host IF. A sub ASIC corresponds to the SATA bridge controller 112 and is independently implemented as an integrated circuit (IC) on the main controller 120. The SATA bridge controller 112 includes three SATA-IPs 203 to 205. On an upstream side of the bridge configuration, a SATA-IP 202 (Host) is connected to the SATA-IP 203 (Device) through an H-Host-IF 206. On a downstream side of the bridge configuration, the SATA-IP 204 (Host1) is connected to the HDD/SSDs 113 through a B-Host1-IF 207, and the SATA-IP 205 (Host2) is connected to the HDD/SSDs 114 through a B-Host2-IF 208. Here, the SATA-IPs 202 to 205 include a SATA link layer and a physical layer. The SATA-IPs 202 to 205 physically issue commands (as electric signals) based on the SATA standard to SATA devices connected through the H-Host-IF 206 to the B-Host2-IF 208 and physically receives statuses (as electric signals) based on the SATA standard from the SATA devices in accordance with settings of various SATA registers.

Furthermore, the SATA bridge controller 112 is connected to a power supply controller 209 through a control signal 214. The power supply controller 209 is mounted on a main board, determines whether power is to be supplied to the functional modules included in the main controller 120 and the various devices connected to the functional modules, and performs power control on the entire printing apparatus. Dashed-dotted lines 210 to 213 extending from the power supply controller 209 indicate power supply lines to the various components included in a SATA bridge unit serving as a portion of the entire system. Note that, although the number of IFs between the SATA host controller 111 and the SATA bridge controller 112 is 1 and the number of IFs between the SATA bridge controller 112 and the HDD/SSDs 113 and 114 is two (2) in this embodiment, the number of IFs may be arbitrarily set as a connection form.

Figure 12:
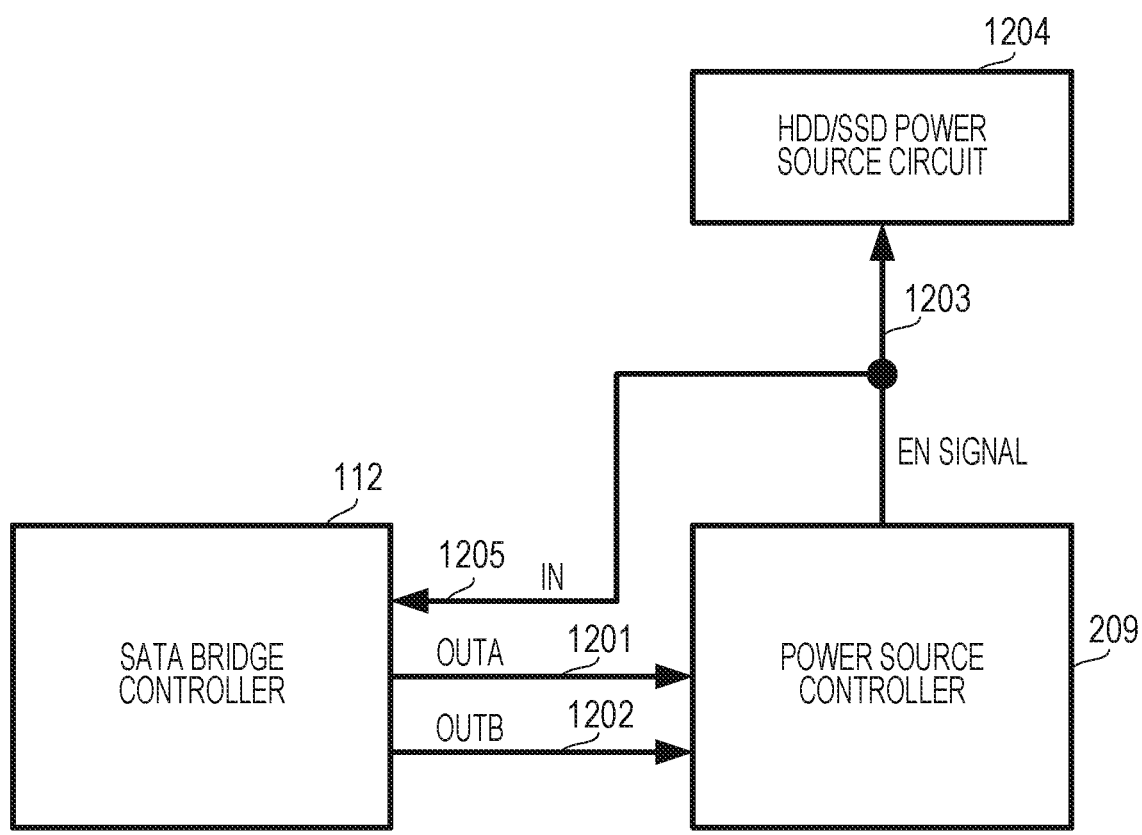
FIG. 12 is a diagram illustrating connection between the SATA bridge controller and a power source controller according to one embodiment.

FIG. 12 is a diagram illustrating the control signal 214 in a resolved manner which performs HDD/SSD power supply control between the SATA bridge controller 112 having the connection configuration illustrated in FIG. 2 and the power supply controller 209 in detail. A control signal IN 1205 is a signal input to the SATA bridge controller 112, and a control signal OUTA 1201 and a control signal OUTB 1202 are signals output to the power supply controller 209. Furthermore, the power supply controller 209 outputs an EN signal 1203 which permits power supply to a power supply circuit 1204 which supplies electric power to the HDD/SSDs 113 and 114. Examples of the power supply circuit 1204 include a DC-DC power source (a direct-input/direct-output power source) and a field effect transistor (FET). The EN signal 1203 is connected to the control signal IN 1205 and input to the SATA bridge controller 112 in a power supply state to the HDD/SSDs 113 and 114, that is, as a monitoring signal for determining whether power is on or off. The control signal OUTA 1201 and the control signal OUTB 1202 are request signals transmitted to the power supply controller 209 so that the power source of the HDD/SSDs 113 and 114 is turned on or off.

Figure 13:
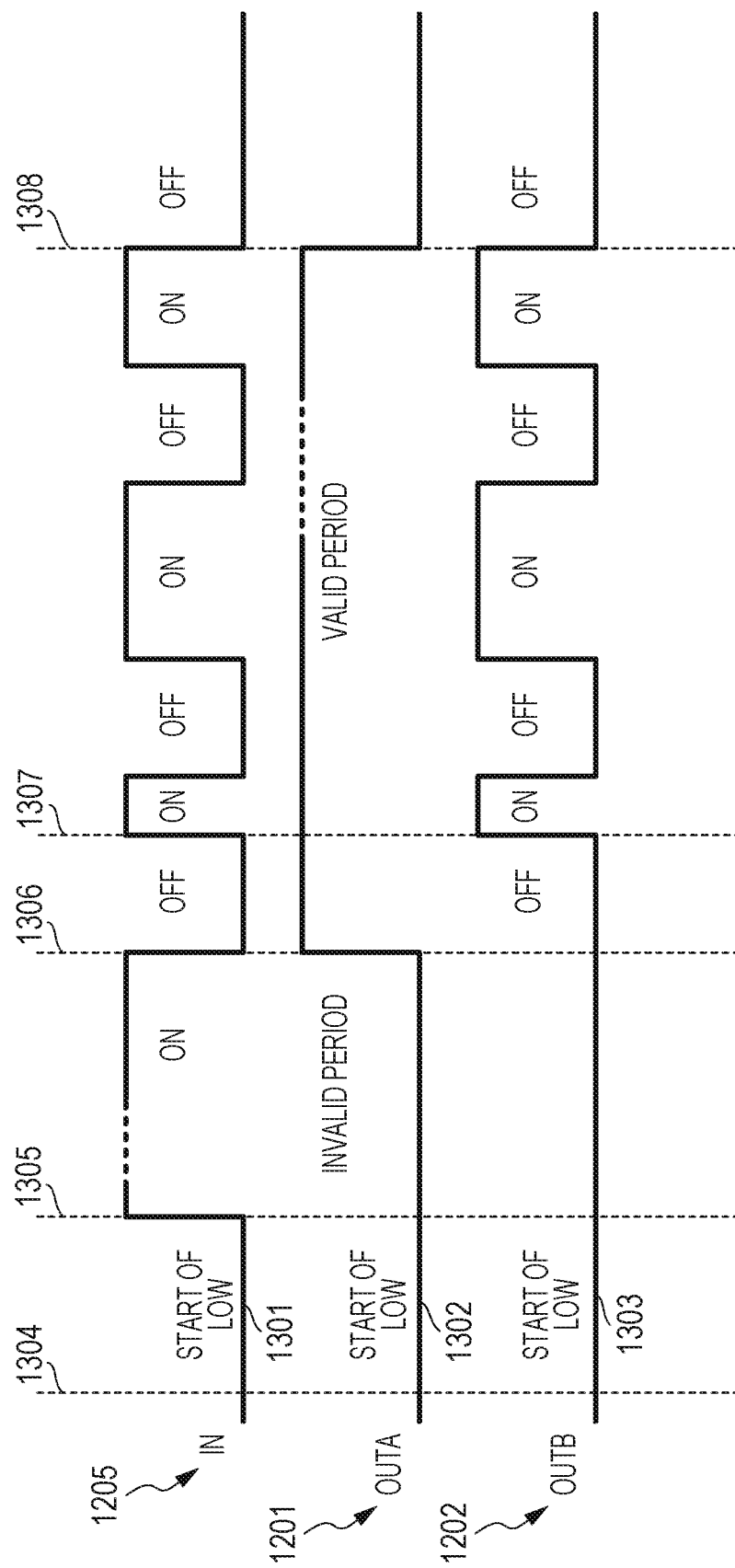
FIG. 13 is a diagram illustrating a power source control timings of an HDD according to one embodiment.

FIG. 13 is a timing chart of the control signal IN 1205, the control signal OUTA 1201, and the control signal OUTB 1202. It is assumed that all the signals are subjected to a low level start process at a starting point 1304. The control signal IN 1205 is a monitoring signal indicating an OFF state or an ON state of the power source of the HDD/SSD, and indicates that the power source of the HDD is turned on at a time point 1305 after activation. The control signal OUTA 1201 is a signal indicating a valid period for issuing a request for turning ON or OFF the HDD/SSD power source to the power supply controller 209. In a period of time from a time point 1306 to a time point 1308 where the control signal OUTA 1201 is at a high level, an OFF request or an ON request of the HDD/SSD power source is issued to the power supply controller 209. The control signal OUTB 1202 is a signal which requests ON or OFF of the HDD/SSD power source. A power ON request is issued in a high-level period whereas a power OFF request is issued in a low-level period. In the example of FIG. 13, the control signal OUTA 1201 is at a high level and the control signal OUTB 1202 is at a low level in the period from the time point 1306 to the time point 1307, and therefore, the HDD/SSD power source is turned off. In the period from the time point 1306 to the time point 1307, the control signal IN 1205 which is the monitoring signal is at a low level, and therefore, the OFF state of the HDD/SSD power source is confirmed. Similarly, the control signal OUTB 1202 is brought into a high level or a low level in the valid period of the high level of the control signal OUTA 1201, and therefore, the control signal IN 1205 is brought into a high level or a low level. Note that, although the control signal IN 1205 serving as the monitoring signal and the control signal OUTB 1202 serving as the power source OFF/ON request signal has the relationship of 1:1 in the example described with reference to FIGS. 12 and 13, the present technique is not limited to this configuration. The plurality of storage devices connected to the SATA bridge controller 112 may be individually controlled by monitoring signals (power supply EN signals) INn and power source OFF/ON request signals OUTBn (n≥2) in which the same numbers n of the Inn and OUTBn signals correspond to each other.

Figure 3:
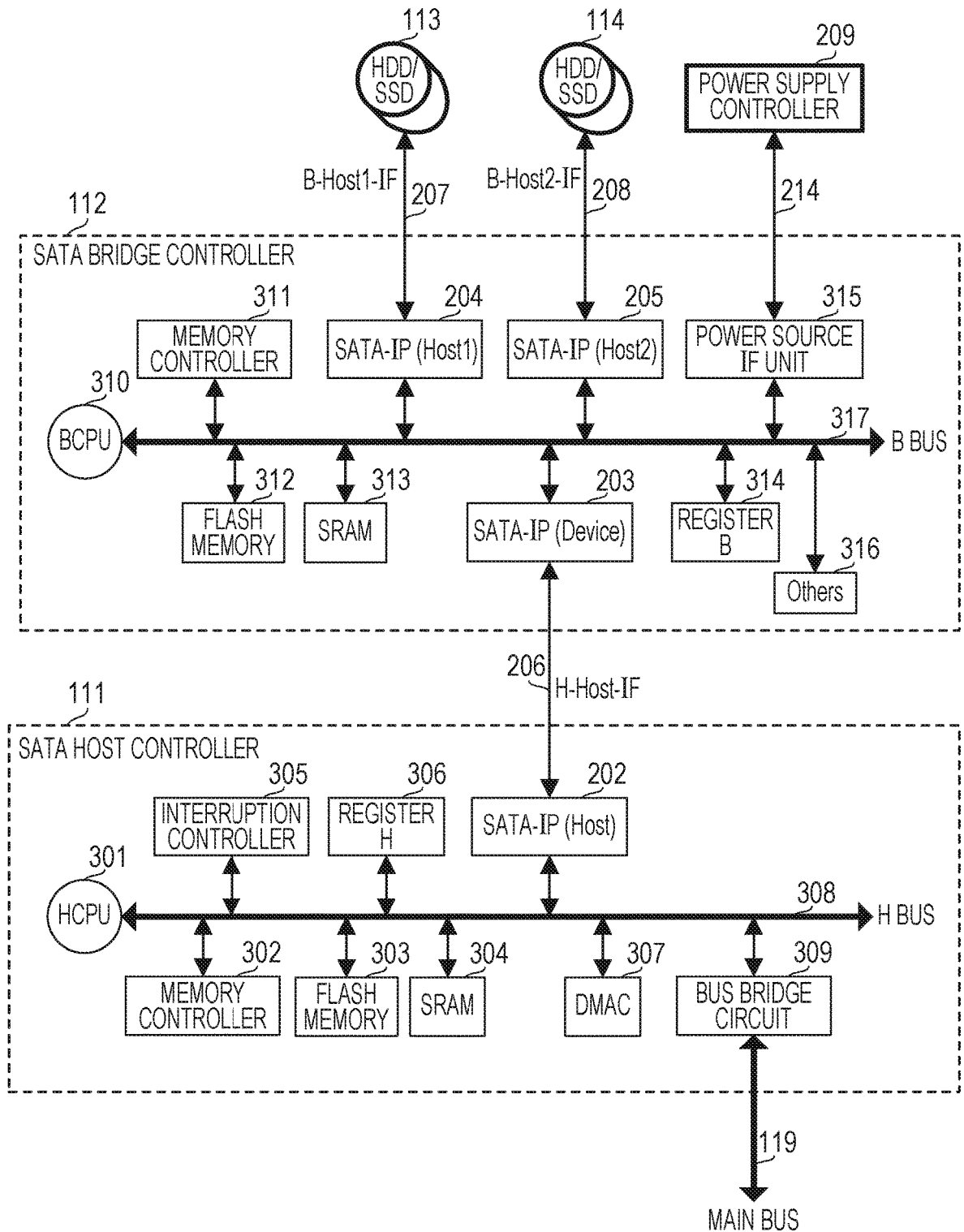
FIG. 3 is a diagram illustrating internal configurations of a SATA host controller and a SATA bridge controller according to one embodiment.

FIG. 3 is a diagram illustrating internal configurations of the SATA host controller 111 and the bridge controller 112. The SATA host controller 111 is a first SATA controller and is connected to the main CPU 101 through the main bus 119. The SATA bridge controller 112 is a second SATA controller and connected to the SATA host controller 111 through the H-Host-IF (a first interface) 206. The HDD/SSDs 113 are devices and connected to the SATA bridge controller 112 through the B-Host1-IF (a second interface) 207. The HDD/SSDs 114 are devices and connected to the SATA bridge controller 112 through the B-Host2-IF (a second interface) 208.

An HCPU 301 performs overall control including a SATA command issuance process, a transmission/reception data transfer process, and a status reception process as a SATA controller. A memory controller 302 performs input/output control on a flash memory 303 and a static random access memory (SRAM) 304. The flash memory 303 stores a boot program and control programs of the SATA controller. The SRAM 304 is used as a work area of the HCPU 301, a region for storing various control tables and various parameters, a data buffer, and the like. Here, control of a one-port RAM, a two-port RAM, a first-in first-out (FIFO) memory, and the like, is described as the SRAM 304 in FIG. 3, and SRAMs which are independently controlled may be disposed in a plurality of portions. An interruption controller 305 performs a process of inputting/outputting an interruption signal relative to the HCPU 301 and a masking process on the interruption signal. A register H 306 temporarily stores control parameters relating to power saving. A direct memory access controller (DMAC) 307 performs data transfer between predetermined memories when the HCPU 301 sets leading addresses of a transfer source and a transfer destination and a size in a predetermined register and the DMAC 307 is activated. An H bus 308 includes a bus controller and collectively represents a control bus, data buses, and local buses between the arbitrary blocks. A bus bridge circuit 309 performs mutual switching between bus protocols of the main bus 119 and the H bus 308.

A BCPU 310 performs overall control as a SATA controller including a SATA command issuance process, a transmission/reception data transfer process, and a status reception process. A memory controller 311 performs input/output control relative to a flash memory 312 and an SRAM 313. The flash memory 312 stores a boot program and control programs of the SATA controller. The SRAM 313 is used as a work area of the BCPU 310, a region for storing various control tables and various parameters, a data buffer, and the like. Here, control of a one-port RAM, a two-port RAM, a FIFO memory, and the like, is described as the SRAM 313 in FIG. 3, and SRAMs which are independently controlled may be disposed in a plurality of portions. A register B 314 temporarily stores control parameters relating to power saving and the like. A power source IF unit 315 is connected to the power supply controller 209 through the control signal 214 and controls a power OFF/ON request signal to be transmitted to the HDD/SSDs 113 and 114. Others 316 collectively represent other functional blocks included in the SATA bridge controller 112, such as the RAID process and the data encryption process. A B bus 317 includes a bus controller and collectively represents a control bus, data buses, and local buses between the arbitrary blocks. Furthermore, as illustrated in FIG. 2, the SATA-IP (Host) 202 of the SATA host controller 111 and the SATA-IP (Device) 203 of the SATA bridge controller 112 are connected to each other through the H-Host-IF 206. Furthermore, the SATA-IPs (Host1 and Host2) 204 and 205 are connected to the HDD/SSDs 113 and 114 through the B-Host1-IF 207 and the B-Host2-IF 208.

Figure 4:
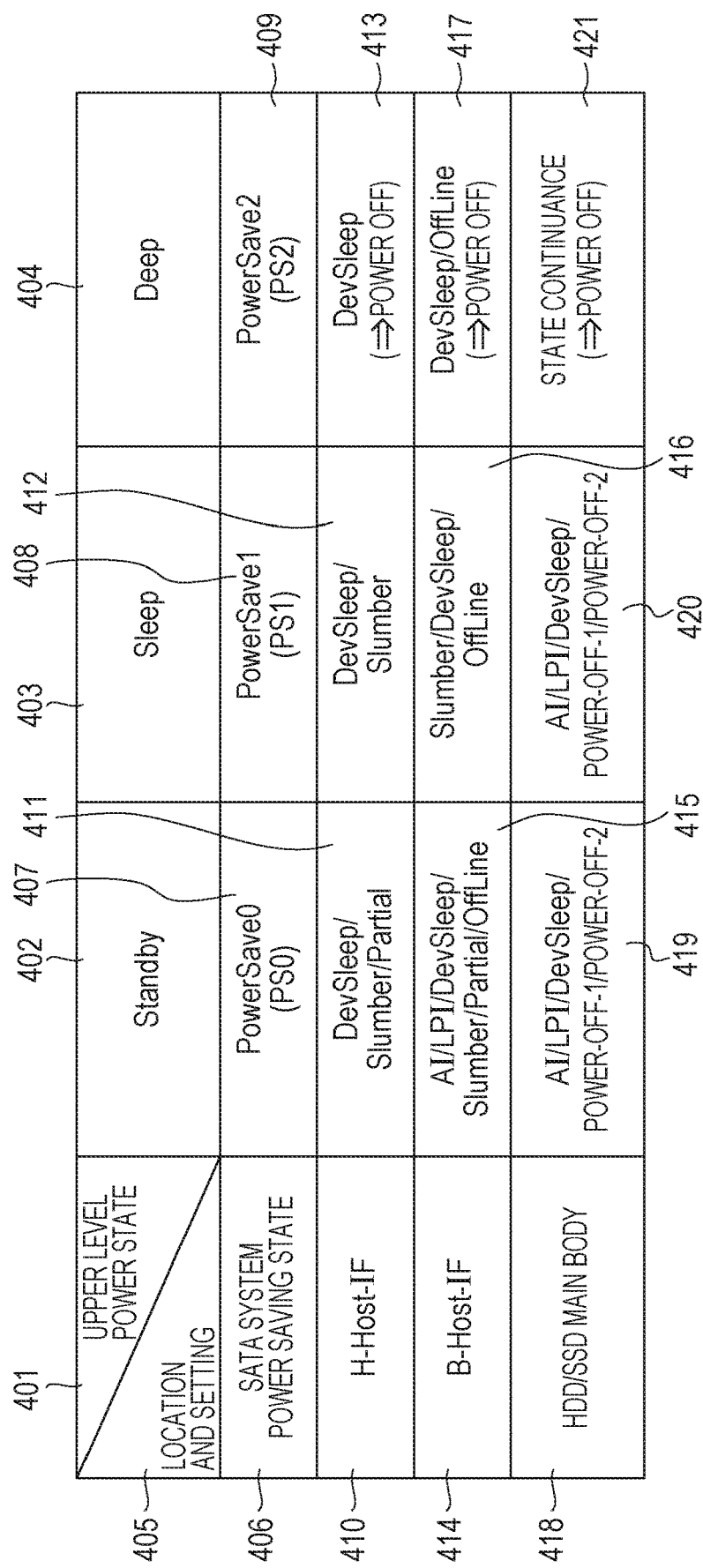
FIG. 4 is a diagram illustrating types (PS0 to PS2) of a SATA system power saving state and setting information according to one embodiment.

FIG. 4 is a diagram illustrating power states of the main controller 120 in a horizontal axis and SATA system power saving states and power saving transition conditions in a vertical axis. In FIG. 4, a first row indicates upper-level power states 401 in the entire printing apparatus, and a Standby mode 402, a Sleep mode 403, and a Deep mode 404 are defined in descending order of power consumption. In the Standby mode 402, the printing apparatus is available for immediate reception of a job, and the main controller 120, the scanner apparatus 109, the panel apparatus 116, the printing unit 118, and the HDD/SSDs 113 and 114 in FIG. 1 are all powered and basically in an idling state. The Sleep mode 403 and the Deep mode 404 indicate power saving states of the printing apparatus and are entered to reduce standby power in a period of time in which a job is not executed. In the Sleep mode 403, the portions which have been described in the Standby mode 402 are powered, but the portions are basically in a power saving state. In particular, in the Deep mode 404, most of the power supply is reduced, and the power is supplied to the memory controller 102, the DRAM 104, the LAN-IF controller 105, the panel IF controller 115, and the panel apparatus 116 in FIG. 1. In the Deep mode 404, deeper power saving states are entered when compared with power saving states of the units in the Sleep mode 403, and other modes correspond to a power off state. It is assumed that the SATA host controller 111, the SATA bridge controller 112, and the HDD/SSDs 113 and 114 serving as connection devices are powered off in the Deep mode 404. Furthermore, power save 0 (PS0) 407, power save 1 (PS1) 408, and power save 2 (PS2) 409 are defined as the SATA system power saving states corresponding to the upper-level power states 401. PS0 407 to PS2 409 correspond to the upper-level power states as illustrated in FIG. 4 and have the following relationship: PS0<PS1<PS2 (power off). On the other hand, time lengths of the returning times corresponding to PS0, PS1 and PS2 are inversed. This is because power saving and returning times are trade off. Furthermore, power saving transition conditions of the H-Host-IF 206 in the various SATA system power saving states are defined in columns 411 to 413, power saving transition conditions of the B-Host1-IF 207 and the B-Host2-IF 208 are defined in columns 415 to 417, and power saving transition conditions of main bodies of the HDD/SSDs are defined in columns 419 to 421. In each of setting values in the columns 411 to 421, one of descriptions divided by "/" in FIG. 4 is set. Note that the number of setting values (that is, the number of states to be entered) may be arbitrarily increased. Furthermore, portions corresponding to an H-Host-IF state 410, a B-Host-IF state 414, and an HDD/SSD main body state 418 which are power saving setting values in FIG. 4 are illustrated in FIG. 2. The H-Host-IF state 410, the B-Host-IF state 414, and the HDD/SSD main body state 418 correspond to the H-Host-IF 206 (including the SATA-IPs 202 and 203), the B-Host1-IF 207 and the B-Host2-IF 208 (including the SATA-IPs 204 and 205), and the HDD/SSDs 113 and 114, respectively. That is, when state transition from PS0 (407) to PS2 (409) is performed, the corresponding portions enter respective states of the setting values of the columns 411 to 421. Here, possible power saving states corresponding to the power saving transition conditions will be described. "AI" indicates "Active-Idle" and "LPI" indicates "Low-Power-Idle". "AI" and "LPI" indicate power states defined in the SATA-IF in an idling state and the ATA standard of the SATA-IF and the connection device main body. As described above, Partial and Slumber are defined in accordance with the SATA-IF specification. "DevSleep" corresponds to power saving states of the SATA-IF and the host device defined by the SATA standard specifications. Furthermore, "OffLine" indicates a state of invalidation (stop) as the SATA-IP. In general, the power saving modes of the SATA-IF are set in descending order of effect as follows: Offline>DevSleep>Slumber>Partial>LPI>AI. Similarly, power saving modes of the device main body are set as follows: Power OFF>DevSleep>LPI>AI. Here, power-off-1 and power-off-2 are set in columns 419 and 420 as conditions for a setting of a power off instruction relative to a connection device and the following definitions are given. In power-off-1, the device main body is not turned on in a next return (priority is given to power saving and long life). In power-off-2, the device main body is turned on simultaneously with a next return (priority is given to convenience). Power saving control in power-off-1 and power-off-2 may be performed taking a life of the HDD in turning off/of into consideration. Although described below, the power saving transition conditions are set in advance when the SATA host controller 111 and the SATA bridge controller 112 are activated. Furthermore, power saving effects of the HCPU system of the SATA host controller 111 and the BCPU system of the SATA bridge controller 112 generally have the same relationship PS0<PS1<PS2 (power off) as trade off relative to the returning time. However, the relationship PS0 PS1<PS2 may be set. Examples of a power saving method of the HCPU 301 and the BCPU 310, include partial power supply reduction using a clock gate and power source separation.

Although the number of power states of the entire printing apparatus is three and the number of steps of the SATA system power saving states corresponding to the states of the entire printing apparatus is three in the example of FIG. 4, the number of power states and the number of SATA system power saving states may be arbitrarily set.

Furthermore, although power saving transition conditions of the B-Host1-IF 207 and the B-Host2-IF 208 correspond to columns 415 to 417 and power saving transition conditions of the HDD/SSD body correspond to columns 419 to 421, the power saving transition conditions may be individually set in a unit of connection port.

FIG. 5 is a diagram illustrating extended commands for setting the power saving transition conditions illustrated in FIG. 4 in the SATA bridge controller 112 in advance. Power saving system extended commands are uniquely defined as an extended command name 501, a CMD (sub-command) number 502, and a transfer type 503 as illustrated from the left in a first row in FIG. 5 relative to vender unique commands (F0h, for example) which are empty commands defined in accordance with the SATA standard. Here, the CMD number 502 indicates a sub-command number relative to the vender unique command (F0h, for example) which is set in a feature register. Furthermore, in the SATA standard, types of transfer including Non-Data (ND) transfer in which data is not transferred, PIO-In (PI)/PIO-Out (PO) transfer in which single data transfer is executed, and DMA transfer in which sequential data transfer is executed are defined as basic transfer types. The transfer type 503 in FIG. 5 defines a transfer type relative to the CMD number 502. For example, a SetupPowerConfig command 505 has a CMD number of 01h (506) and a transfer type of PO (507). Similarly, a ToSleep command 509 includes a CMD number of 02h (510) and a transfer type of ND (511). A ToDeep command 513 includes a CMD number of 03h (514) and a transfer type of ND (515). A GetStatus command 517 includes a CMD number of 04h (518) and a transfer type of PI (519).

The SetupPowerConfig command 505 is used to set the power saving transition conditions 411 to 413 of the H-Host-IF 206 to the SATA bridge controller 112 as indicated by a designation 508. The SetupPowerConfig command 505 is used to set the power saving transition conditions 415 to 417 of the B-Host1-IF 207 and the B-Host2-IF 208 to the SATA bridge controller 112 as indicated by the designation 508. Furthermore, the SetupPowerConfig command 505 is used to set the power saving transition conditions 419 to 421 of the HDD/SSD main body to the SATA bridge controller 112 as indicated by the designation 508.

The ToSleep command 509 is used to notify the SATA bridge controller 112 of transition of the upper level power state to the Sleep mode 403 as indicated by a designation 512. The ToDeep command 513 is used to notify the SATA bridge controller 112 of transition of the upper level power state to the Deep mode 404 as indicated by a designation 516. A GetStatus command 517 is used to obtain a status of the entire SATA bridge controller 112 as indicated by a designation 520. Although the GetStatus command 517 is not directly associated with power saving, the GetStatus command 517 is used when an upper level system obtains information indicating that the power saving transfer process has been completed, for example. Hereinafter, commands which are defined in accordance with the ATA standard and which are different from the extended commands are referred to as "ATA commands".

Furthermore, a method for controlling the printing apparatus (the electronic device) of this embodiment will be described with reference to a number of flowcharts. Note that descriptions of error processes which do not relate to this embodiment are basically omitted so that complication of description is avoided.

Figure 6:
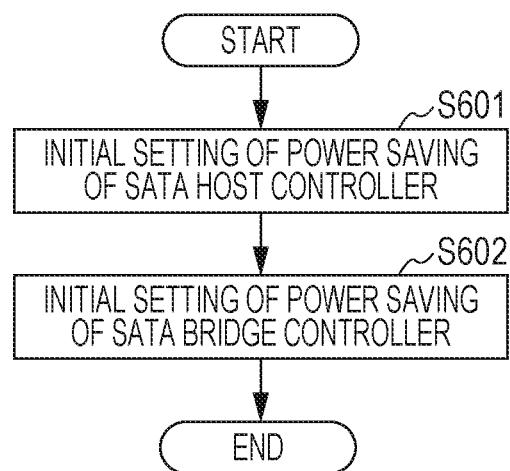
FIG. 6 is a flowchart of initialization to a SATA system power saving setting according to one embodiment.

FIG. 6 is a flowchart of an initial setting of the SATA system power saving control. The following process is performed when the main controller 120 is activated (cold boot). In step S601, the main CPU 101 sets the power saving transition conditions 411 to 413 of the H-Host-IF 206 illustrated in FIG. 4 to the SATA host controller 111 for individual power saving states PS0 to PS2. In step S602, the main CPU 101 performs a power saving initial setting by causing the SATA host controller 111 to issue the SetupPowerConfig command 505 to the SATA bridge controller 112. Specifically, the main CPU 101 sets the power saving transition conditions 415 to 417 of the B-Host1-IF 207 and the B-Host2-IF 208 illustrated in FIG. 4 to the SATA host controller 112 for individual power saving states PS0 to PS2. Furthermore, the main CPU 101 sets the power saving transition conditions 419 to 421 of the HDD/SSDs 113 and 114 illustrated in FIG. 4 to the SATA bridge controller 112 for individual power saving states PS0 to PS2. The BCPU 310 which has received the SetupPowerConfig command 505 records the power saving transition conditions in predetermined portions. Here, examples of the portions for recording the power saving transition conditions in the SATA host controller 111 and the SATA bridge controller 112 include the register H 306, the register B 314, the SRAMs 304 and 313, and the flash memories 303 and 312. The portions are not particularly limited as long as the power saving transition conditions may be read in the power saving transition process. Although the initial setting at a time of activation of the main controller 120 is described above, the power saving transition conditions may be reset at an arbitrary timing by the same setting method when the printing apparatus is in the Standby mode 402. Note that, in the activation (cold boot) of the printing apparatus in this embodiment, the upper level power state enters the Standby mode 402 and the SATA control system and the storage device connected to the SATA control system enter the idling state.

Figure 7:
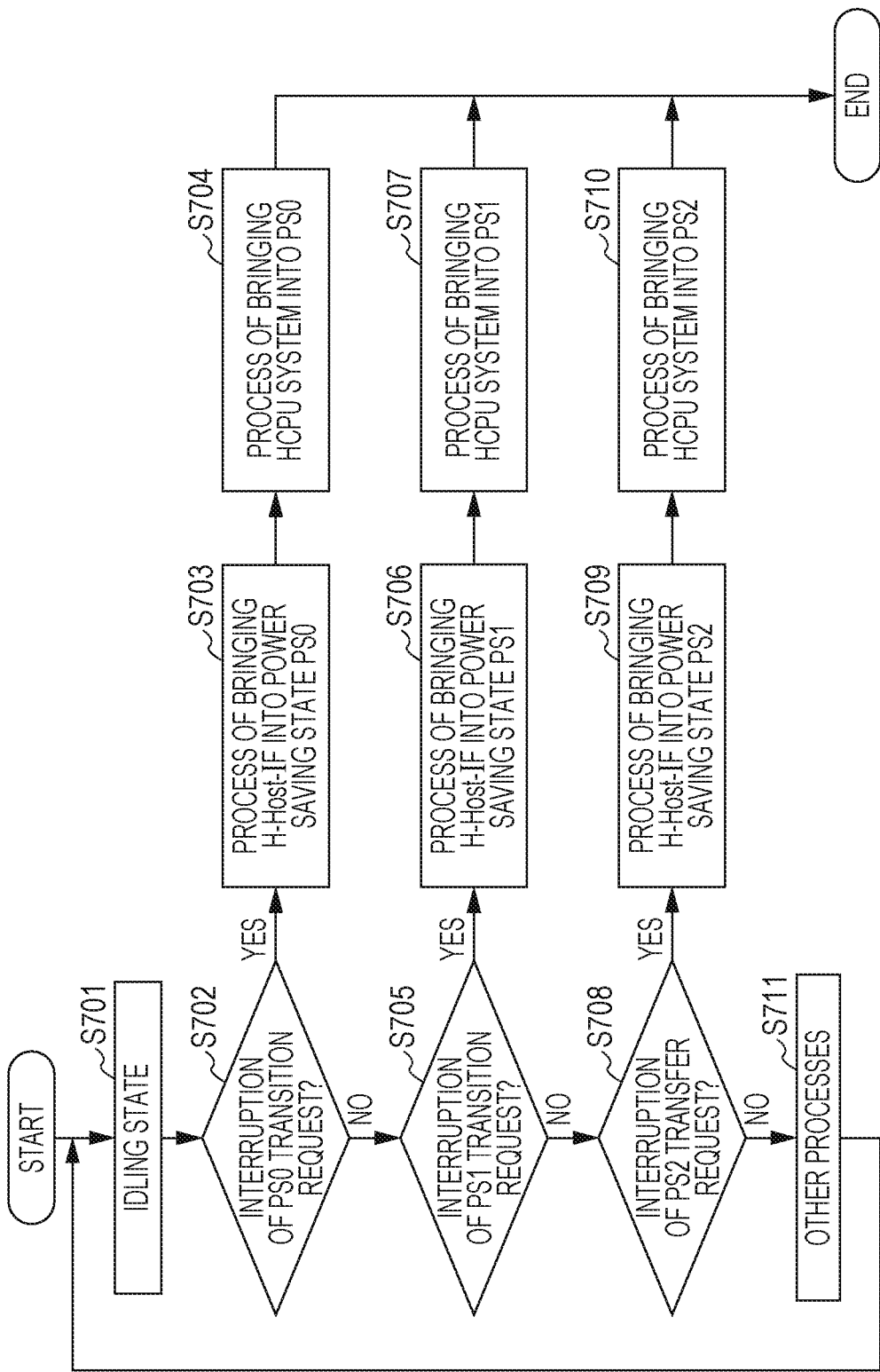
FIG. 7 is a flowchart of a power saving transition process performed by the SATA host controller according to one embodiment.

FIG. 7 is a flowchart of a sequence of the power saving transition process performed by the SATA host controller 111. In step S701, the HCPU 301 which is in the idling (standby) state waits for an interruption instruction supplied from the main CPU 101. In step S702, the main CPU 101 issues an interruption instruction for requesting transition from the idling state to one of the power saving states PS0 to PS2 which have different power saving effects to the SATA host controller 111. The HCPU 301 examines the received interruption signal. When a result of the examination indicates an interruption for requesting transition to PS0 (YES), the HCPU 301 proceeds to step S703, and otherwise (NO), the HCPU 301 proceeds to step S705. In step S703, the HCPU 301 performs a process of transition from the idling state to the power saving state PS0 (407) on the H-Host-IF 206 in accordance with the setting performed in step S601 of FIG. 6. Specifically, the HCPU 301 issues an instruction for the transition from the idling state to the power saving state PS0 to the SATA bridge controller 112. In step S704, the HCPU 301 performs a process of transition from the idling state to the power saving state PS0 (407) on the SATA host controller 111.

In step S705, when a result of the examination is an interruption for requesting transition to PS1 (YES), the HCPU 301 proceeds to step S706, and otherwise (NO), the HCPU 301 proceeds to step S708. In step S706, the HCPU 301 performs a process of transition from the idling state to the power saving state PS0 (408) on the H-Host-IF 206 in accordance with the setting performed in step S601 of FIG. 6. Specifically, the HCPU 301 issues an instruction for the transition from the idling state to the power saving state PS1 to the SATA bridge controller 112. In step S707, the HCPU 301 performs a process of transition from the idling state to the power saving state PS1 (408) on the SATA host controller 111.

In step S708, when a result of the examination is an interruption for requesting transition to PS2 (YES), the HCPU 301 proceeds to step S709, and otherwise (NO), the HCPU 301 proceeds to step S711. In step S709, the HCPU 301 performs a process of transition from the idling state to the power saving state PS2 (409) on the H-Host-IF 206 in accordance with the setting performed in step S601 of FIG. 6. Specifically, the HCPU 301 issues an instruction for the transition from the idling state to the power saving state PS2 to the SATA bridge controller 112. In step S710, the HCPU 301 performs a process of transition from the idling state to the power saving state PS2 (409) on the SATA host controller 111.

In step S711, the HCPU 301 executes a process corresponding to an interruption other than the power saving transition request, for example, a write command issuance process at a time of normal data transfer, returns to step S701 after completion of the process, and enters the idling state. Note that, after the transition to the requested power saving state, the HCPU 301 transmits a transition completion interruption to the main CPU 101, and simultaneously transmits information indicating that a portion of the register H 306 corresponds to a status register in a power saving state.

Here, the power saving transition condition of the H-Host-IF 206 set in PS0 (407) to PS2 (409) will be described. In "Partial" and "Slumber", a request packet defined in the SATA standard is transmitted, and when a transmission destination permits the packet, a power saving state corresponding to the SATA-IF may be entered. Furthermore, in "DevSleep", the SATA-IF enters "Slumber" first so that a DEVSLP signal which is a single end signal is enabled. In this way, power consumption of the connection device main body may be reduced.

Figure 8:
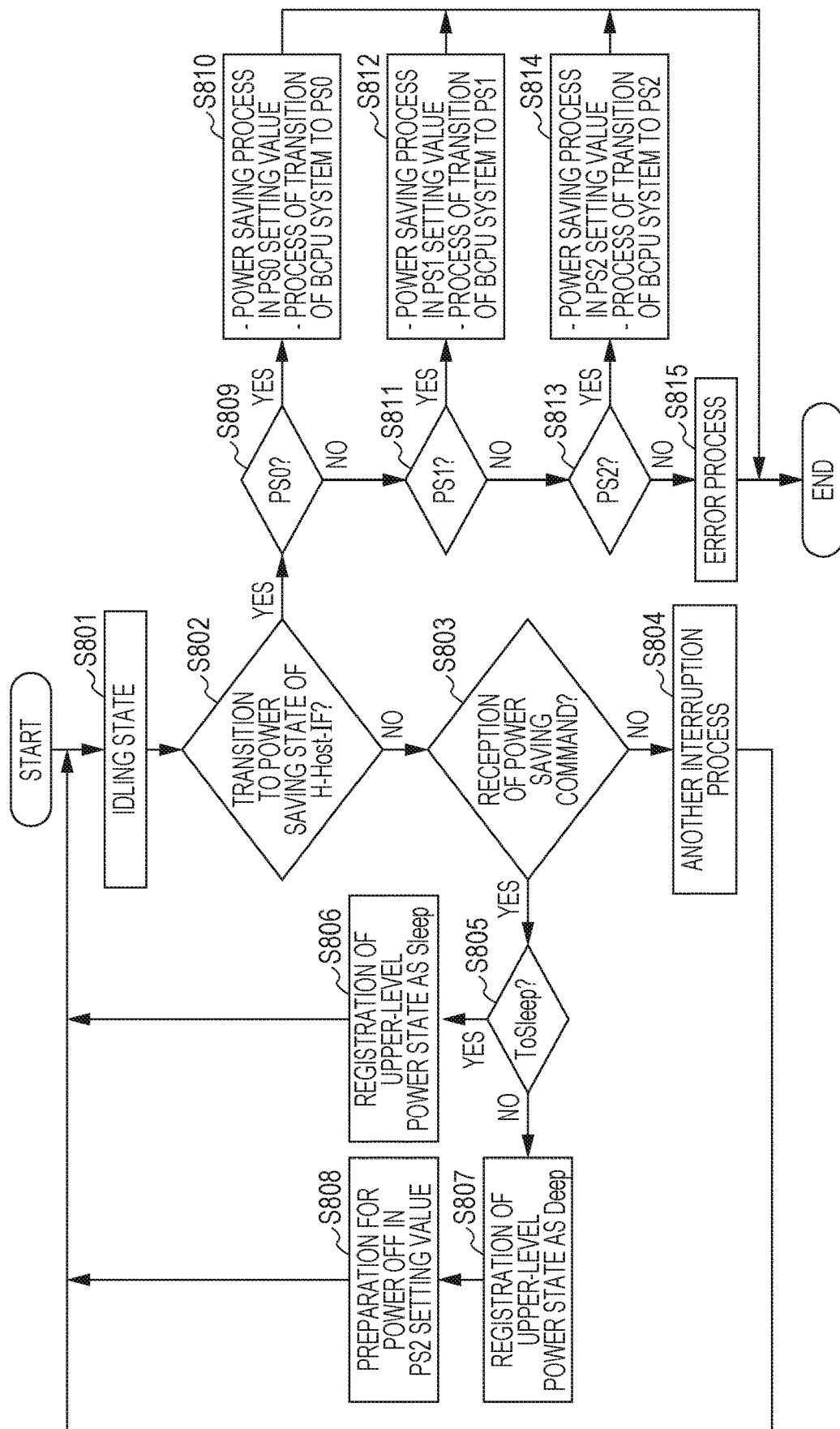
FIG. 8 is a flowchart of a power saving transition process performed by the SATA bridge controller according to one embodiment.

FIG. 8 is a flowchart of a sequence of the power saving transition performed by the SATA bridge controller 112. In step S801, the BCPU 310 is in a waiting state, that is, the idling state. The BCPU 310 is basically waiting for an interruption instruction supplied from the HCPU 301 included in the SATA host controller 111. In step S802, the BCPU 310 determines whether the received interruption signal indicates a notification for transition to the power saving state of the H-Host-IF 206 (whether an event which causes the transition has occurred). When the determination result is the notification for transition to the power saving state of the H-Host-IF 206 (YES), the BCPU 310 proceeds to step S809. Furthermore, when the determination result is not the notification for transition to the power saving state of the H-Host-IF 206 (NO), the BCPU 310 proceeds to step S803.

In step S803, the BCPU 310 determines whether the received interruption signal is an extended command of the power saving system. When the determination is affirmative (YES), the BCPU 310 proceeds to step S805 whereas when the determination is negative (NO), the BCPU 310 proceeds to step S804. In step S804, the BCPU 310 executes another interruption process, such as an ATA command process, and returns to the idling state in step S801.

In step S805, the BCPU 310 determines whether the received power saving system command is the ToSleep command 509. When the determination is affirmative (YES), the BCPU 310 proceeds to step S806, and otherwise (NO), the BCPU 310 proceeds to step S807. In step S806, the BCPU 310 sets the upper level power state to the Sleep mode 403 to be registered in the register B 314, the SRAM 313, and the like and returns to the idling state in step S801 again.

In step S807, the BCPU 310 determines that the received power saving system command is the ToDeep command 513, registers the upper level power state of the Sleep mode 403 in the register B 314, the SRAM 313, and the like, and proceeds to step S808. In step S808, the BCPU 310 performs Deep transition preparation and returns to the idling state in step S801 again. In the Sleep mode 403, a power off process is basically performed by the power supply controller 209. Therefore, certain types of ICs, such as storage devices which do not permit temporary blackout (an HDD or an SSD) and the SATA bridge controller 112 incorporating a flash memory, perform power off preparation, and a power off timing is required to be transmitted after completion of the preparation. A result of a determination as to whether the power off preparation has been completed as the PS2 state may be obtained by the GetStatus command 517. The main CPU 101 transmits a power off permission to the power supply controller 209 after the SATA host controller 111 and the SATA bridge controller 112 confirm that the power off preparation has been completed by the status obtaining section described above. As preparation for HDD power off, a FLUSH CACHE command and a SLEEP command conforming to the ATA standard are issued so that data saving, physical header saving, and the like, are performed.

In step S809, the BCPU 310 determines whether the upper level power state is to be changed from the power saving transition condition 411 of the H-Host-IF 206 which is set in advance as the Standby mode 402 to the PS0 (407). When the determination is affirmative (YES), the BCPU 310 proceeds to step S810, and otherwise (NO), the BCPU 310 proceeds to step S811. In step S810, the BCPU 310 performs a process of transition from the idling state to the power saving state PS0 (407) on the B-Host1-IF 207 and the B-Host2-IF 208 based on the power saving transition condition 415 of the B-Host1-IF 207 and the B-Host2-IF 208 which is set in advance. Furthermore, the BCPU 310 performs a process of transition from the idling state to the power saving state PS0 (407) on the HDD/SSDs 113 and 114 based on the power saving transition condition 419 of the HDD/SSD main body set in advance. For example, the BCPU 310 instructs power off of the HDD/SSDs 113 and 114 in power-off-1 (a first power off mode) or power-off-2 (a second power off mode). Then the BCPU 310 performs a process of transition from the idling state to the power saving state PS0 (407) on the SATA bridge controller 112.

In step S811, the BCPU 310 determines whether the upper level power state is to be changed from the power saving transition condition 412 of the H-Host-IF 206 which is set in advance as the Sleep mode 403 to the PS1 (408). When the determination is affirmative (YES), the BCPU 310 proceeds to step S812, and otherwise (NO), the BCPU 310 proceeds to step S813. In step S812, the BCPU 310 performs a process of transition from the idling state to the power saving state PS1 (408) on the B-Host1-IF 207 and the B-Host2-IF 208 based on the power saving transition condition 416 of the B-Host1-IF 207 and the B-Host2-IF 208 which is set in advance. Furthermore, the BCPU 310 performs a process of transition from the idling state to the power saving state PS1 (408) on the HDD/SSDs 113 and 114 based on the power saving transition condition 420 of the HDD/SSD main body set in advance. For example, the BCPU 310 instructs power off of the HDD/SSDs 113 and 114 in power-off-1 (the first power off mode) or power-off-2 (the second power off mode). Then the BCPU 310 performs a process of transition from the idling state to the power saving state PS1 (408) on the SATA bridge controller 112.

In step S813, the BCPU 310 determines whether the upper level power state is to be changed from the power saving transition condition 413 of the H-Host-IF 206 which is set in advance as the Deep mode 404 to the PS2 (409). When the determination is affirmative (YES), the BCPU 310 proceeds to step S814, and otherwise (NO), the BCPU 310 proceeds to step S815. In step S814, the BCPU 310 performs a process of transition from the idling state to the power saving state PS2 (409) on the B-Host1-IF 207 and the B-Host2-IF 208 based on the power saving transition condition 417 of the B-Host1-IF 207 and the B-Host2-IF 208 which is set in advance. Furthermore, the BCPU 310 performs a process of transition from the idling state to the power saving state PS2 (409) on the HDD/SSDs 113 and 114 based on the power saving transition condition 421 of the HDD/SSD main body set in advance. Then the BCPU 310 performs a process of transition from the idling state to the power saving state PS2 (409) on the SATA bridge controller 112. In step S815, the BCPU 310 performs an error process since the power saving transition has failed and executes a status notification or the like to the upper level.

As described above, the SATA bridge controller 112 performs the determination of transition to one of the power saving states PS0 (407) to PS2 (409). In this case, the SATA bridge controller 112 determines one of PS0 to PS2 in accordance with two conditions, that is, information on an upper level power state (the Standby mode 402, the Sleep mode 403, or the Deep mode 404) and the power saving state of the H-Host-IF 206. In a case where the power saving state is PS0 or PS1 and the power saving transition conditions 419 to 421 of the HDD/SSD main body indicate a power off instruction (the power-off-1 or the power-off-2), the BCPU 310 transmits a request for turning off the HDD/SSD power source to the power supply controller 209 as illustrated in FIGS. 12 and 13.

Figure 9:
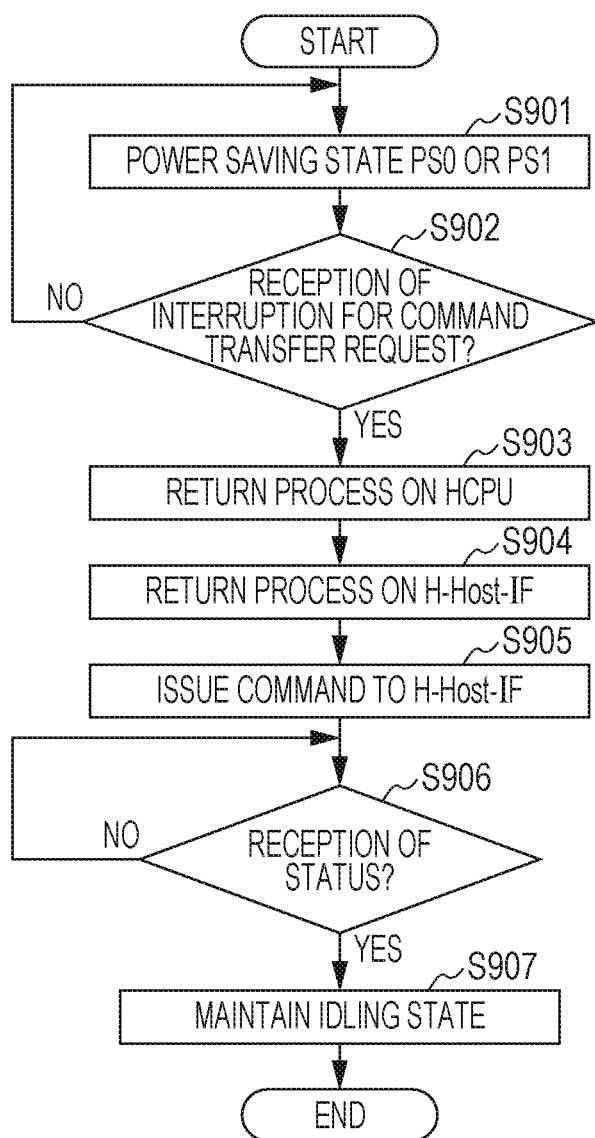
FIG. 9 is a flowchart of a process of return from a power saving state performed by the SATA host controller according to one embodiment.

FIG. 9 is a flowchart of a sequence of return from the PS0 (4007) or PS1 (408) of the SATA host controller 111. In step S901, the HCPU 301 is in the power saving state PS0 or PS1. In step S902, the HCPU 301 waits for an interruption request issued by the main CPU 101. If the interruption request has not been received (No in step S902), the HCPU 301 returns to step S901 and the power saving state PS0 or PS1 is maintained. When receiving a command transfer request interruption, the HCPU 301 proceeds to step S903. Specifically, when the main CPU 101 instructs return from the power saving state PS0 or PS1 to the idling state, the HCPU 301 proceeds to step S903. In step S903, the HCPU 301 performs a process of return from the power saving state PS0 or PS1 to the idling state on the SATA host controller 111. In step S904, the HCPU 301 performs a process of return from the power saving state PS0 or PS1 to the idling state on the H-Host-IF 206. Specifically, the HCPU 301 performs a link establish process until command issuance is available through a predetermined sequence of an Out Of Band (COB) or speed negotiation defined by the SATA standard. Here, the return from the SATA IF system power saving state is basically started by issuance of a ComReset signal which is a reset signal defined by the SATA standard. Return from DevSleep is started in a reversed procedure of the transition described in FIG. 7, that is, by issuing the ComReset signal (or a ComWake signal) after the DEVSLP signal is disenabled. In step S905, when determining the link establishment, the HCPU 301 issues a request command supplied from the main CPU 101 to the H-Host-IF 206. In step S906, the HCPU 301 waits for a Status reception from the SATA-IP (Device) 203. When Status has not been received (NO in S906), the HCPU 301 continues the waiting state, whereas when Status has been received (YES in S906), a series of command process is terminated and the process proceeds to step S907. In step S907, the SATA host controller 111 maintains the idling state until the main CPU 101 issues a power saving transition request again.

Figure 10:
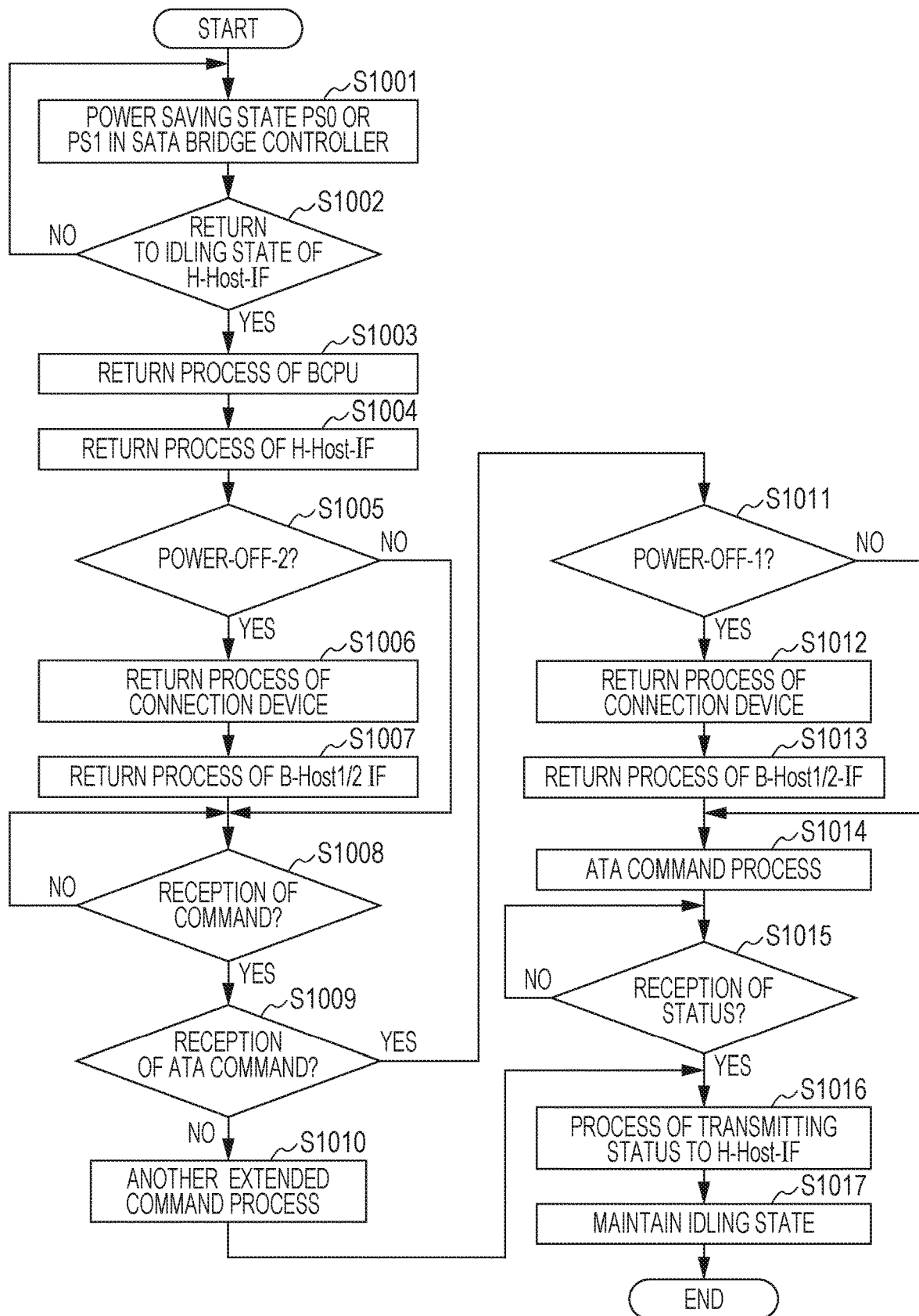
FIG. 10 is a flowchart of a process of return from a power saving state performed by the SATA bridge controller according to one embodiment.

FIG. 10 is a flowchart of a sequence of return from PS0 (407) or PS1 (408) of the SATA host controller 112. In step S1001, the BCPU 310 is in the power saving state PS0 or PS1. In step S1002, the BCPU 310 waits for an interruption request. When the interruption request has not been received (NO in step S1002), the BCPU 310 returns to step S1001 and the power saving state PS0 or PS1 is maintained. When the interruption for starting the process of return to the idling state of the H-Host-IF 206 has been received (YES in step S1002), the BCPU 310 proceeds to step S1003. Specifically, when an event which causes return from the power saving state occurs, the BCPU 310 proceeds to step S1003. Here, after start of the return process, an interruption signal is issued when a level change which disables the DEVSLP signal is detected or when the ComReset (or ComWake) signal illustrated in FIG. 9 is issued. In step S1003, the BCPU 310 performs a process of return from the power saving state PS0 or PS1 to the idling state on the SATA host controller 112. In step S1004, the BCPU 310 performs a process of return from the power saving state PS0 or PS1 to the idling state on the H-Host-IF 206. Specifically, the BCPU 310 performs a link establishment process until command issuance is available through a predetermined sequence of an Out Of Band (COB) or speed negotiation defined by the SATA standard.

In step S1005, the BCPU 310 determines whether a device main body transition setting condition in a preceding power saving transition is the power-off-2. Here, the BCPU 310 is required to record a result of a determination as to whether a transition setting condition of the device main body in the preceding power saving transition is the power-off-1 or the power-off-2. In PS0 (407) and PS1 (408), although at least the SATA controller of the HCPU 301 or the BCPU 310 enters the power saving state, the SATA controller does not enter a power off state. Therefore, information on a result of the determination of the power-off-1 or the power-off-2 may be recorded in the register H 306 or the register B 314, for example. The recording is used only in next return from the power saving state and is cleared after the return. In a case of the power-off-2 (YES) (and the control signal IN 1205 is in a low level), the BCPU 310 proceeds to step S1006, and otherwise (NO), the BCPU 310 proceeds to step S1008. Specifically, the BCPU 310 determines whether the BCPU 310 proceeds to step S1006 in accordance with content of the power off instruction.

In step S1006, the BCPU 310 performs a process of return from the power saving state PS0 or PS1 to the idling state on the connection device. When the HDD/SSDs 113 and 114 which are connection devices are in a power off state, the BCPU 310 issues a request for turning on the HDD/SSDs 113 and 114 to the power supply controller 209 as illustrated in FIGS. 12 and 13. Specifically, the BCPU 310 instructs power on of the HDD/SSDs 113 and 114 in the case of the power-off-2 whereas the BCPU 310 does not instruct power on of the HDD/SSDs 113 and 114 in the case of the power-off-1.

In step S1007, the BCPU 310 performs a process of return from the power saving state PS0 or PS1 to the idling state on the B-Host1-IF 207 and the B-Host2-IF 208, and proceeds to step S1008. The return process is the same as the return process of the H-Host-IF 206 illustrated in FIG. 9.

In step S1008, the BCPU 310 starts waiting a command reception when confirming the link establishment. At this time point, the return from the power saving state to the idling state is completed. When a command has not been received (NO), the BCPU 310 stays in step S1008, and otherwise (YES), the BCPU 310 proceeds to step S1009.

In step S1009, the BCPU 310 determines whether the command supplied from the SATA host controller 111 is an ATA command. When the determination is affirmative (YES), the BCPU 310 proceeds to step S1011 whereas when the determination is negative (NO), the BCPU 310 proceeds to step S1010. In step S1011, the BCPU 310 determines whether a device main body transition setting condition in a preceding power saving transition is power-off-1. In a case of power-off-1 (and the control signal IN 1205 is in a low level), the BCPU 310 proceeds to step S1012, and otherwise (NO), the BCPU 310 proceeds to step S1014.

In step S1012, as with the process in step S1006, the BCPU 310 performs a process of return from the power saving state PS0 or PS1 to the idling state on the HDD/SSDs 113 and 114 which are the connection device. In the case of power-off-1, the BCPU 310 instructs turning on of the HDD/SSDs 113 and 114. In step S1013, as with the process in step S1007, the BCPU 310 performs a process of return from the power saving state PS0 or PS1 to the idling state on the B-Host1-IF 207 and the B-Host2-IF 208, and proceeds to step S1014.

In step S1014, the BCPU 310 performs a process of the ATA command. In step S1015, the HCPU 301 waits for a reception of Status from the HDD/SSDs 113 and 114. When Status has not been received (NO in S1015), the HCPU 301 continues the waiting state, whereas when Status has been received (YES in S1015), the HCPU 301 proceeds to step S1016.

In step S1009, when a received command is an extended command, the BCPU 310 proceeds to step S1010. After executing an extended command process in step S1010, the BCPU 310 proceeds to step S1016.

In step S1016, the BCPU 310 reflects a result of a process performed using the status information or the extended command supplied from the HDD/SSDs 113 and 114 in a status packet defined based on the SATA standard and transmits the status packet to the SATA-IP (Host) 201. By this, the BCPU 310 terminates a series of the command process. In step S1017, the SATA bridge controller 112 maintains the idling state until the main CPU 101 issues a power saving transition request again.

Figure 11:
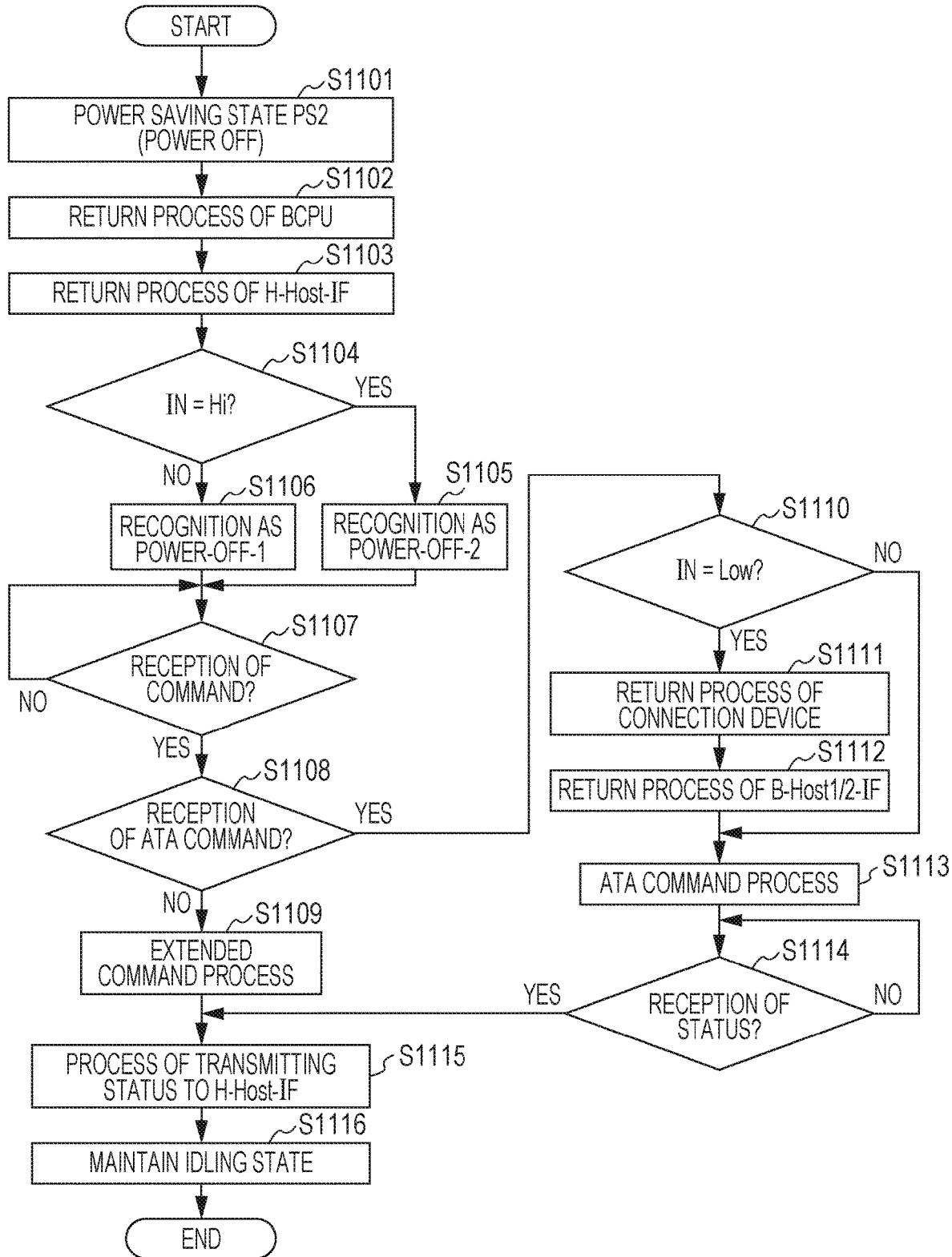
FIG. 11 is a flowchart of a sequence of return from the power saving state PS2 according to one embodiment.

FIG. 11 is a flowchart of a sequence of return from PS2 (409) of the SATA bridge controller 112. Note that a description will be made provided that an HDD is used as a connection device. In step S1101, the HCPU 301 and the BCPU 310 are in a power off state due to a preceding PS2 transition process. Thereafter, the power supply controller 209 start power supply (that is, powered on) to the SATA host controller 111 and the SATA bridge controller 112. In step S1102, the BCPU 310 performs a return process (a boot process). In step S1103, the BCPU 310 executes a process of return on the H-Host-IF 206. Specifically, a boot process of the HCPU 301 is started simultaneously with a boot process of the BCPU 310. In the return process of the H-Host-IF 206, as described above, a link is established through the COB and the speed negotiation using the ComReset signal supplied from the SATA-IP (Host) 202 to the SATA-IP (Device) 203 as a base point. After the establishment of the link in step S1103, the BCPU 310 establishes a link in a SATA lower layer. In step S1104, the BCPU 310 examines the control signal IN 1205 which monitors an HDD power supply state so as to determine whether the HDD power source is in an OFF state or an ON state. When the control signal IN 1205 is in a high level (YES), the BCPU 310 proceeds to step S1105, and otherwise (NO), the BCPU 310 proceeds to step S1106.

In step S1105, the BCPU 310 recognizes power-off-2 (return with power ON) and proceeds to step S1107. In step S1106, the BCPU 310 recognizes power-off-1 (return without power ON) and proceeds to step S1107. Here, not only a determination as to whether transition to power saving has been performed but also a connection state of the HDD may be obtained using the GetStatus command 517. After the SATA host controller 111 and the SATA bridge controller 112 are activated, the main CPU 101 determines an error if an HDD connection does not become available (a link establishment state) within a predetermined period of time. Here, in the examination of the HDD connection state using the GetStatus command 517, the examination may be performed while a non-connection state 1 (connection error) and a non-connection state 2 (non-connection as power-off-1) are distinguished from each other.

Figure 14:
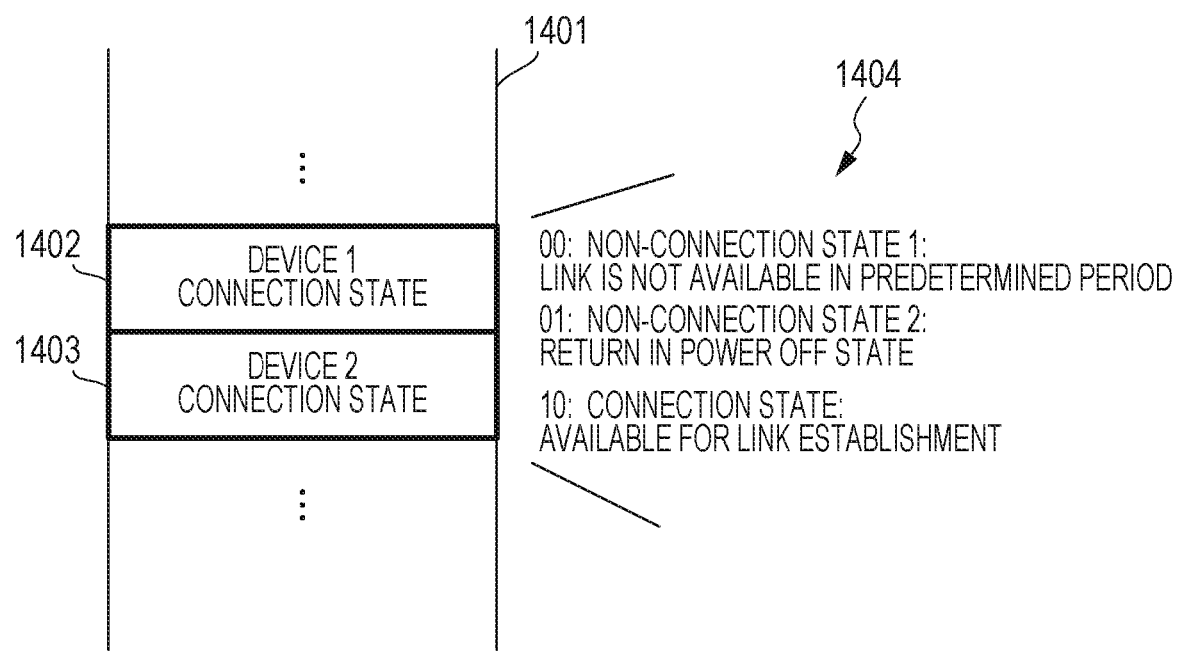
FIG. 14 is a diagram illustrating obtainment of device connection states according to one embodiment.

FIG. 14 is a diagram illustrating obtainment of device connection states reported using the GetStatus command 517. Content of the report using the GetStatus command 517 includes a device-1 connection state 1402 and a device-2 connection state 1403, and furthermore, state definitions 1404 are illustrated. For example, "state: 01" is reported to the main CPU 101 in return in an intentional power off state. The BCPU 310 may appropriately represent an HDD connection state report using the GetStatus command 517 as non-connection 2 by the recognition in step S1105 or step S1106. The main CPU 101 which determines the non-connection 2 recognizes as intentional non-connection and is not to be subjected to an error process in this case.

In step S1107, the BCPU 310 starts waiting a command reception when confirming that the link in the upper layer has been established. At this time point, the return from the power saving state to the idling state is completed. When a command has not been received (NO), the BCPU 310 stays in step S1107, and otherwise (YES), the BCPU 310 proceeds to step S1108.

In step S1108, the BCPU 310 determines whether the received command is an ATA command. When the determination is affirmative (YES), the BCPU 310 proceeds to step S1110, and otherwise (NO), the BCPU 310 proceeds to step S1109.

In step S1110, the BCPU 310 examines the control signal IN 1205 which monitors an HDD power supply state so as to determine whether the HDD power source is in an OFF state or an ON state. When the control signal IN 1205 is in a low level (YES), the BCPU 310 proceeds to step S1111, and otherwise (NO), the BCPU 310 proceeds to step S1113. In step S1111, as with the process in step S1006, the BCPU 310 performs a return process of the connection device. Next, in step S1112, as with the process in step S1007, the BCPU 310 performs a return process on the B-Host1-IF 207 and the B-Host2-IF 208 before proceeding to step S1113.

In step S1113, the BCPU 310 executes an ATA command process. In step S1114, the HCPU 301 waits for a reception of Status from the HDDs 113 and 114. When Status has not been received (NO in S1114), the HCPU 301 continues the waiting state, and otherwise (YES in S1114), the HCPU 301 proceeds to step S1115. Furthermore, after executing an extended command process in step S1109, the BCPU 310 proceeds to step S1115.

In step S1115, the BCPU 310 reflects a result of a process performed using the status information or the extended command supplied from the HDDs 113 and 114 in a status packet defined based on the SATA standard and transmits the status packet to the SATA-IP (Host) 201. By this, the BCPU 310 terminates a series of the command process. In step S1116, the SATA bridge controller 112 maintains the idling state until the main CPU 101 issues a power saving transition request again.

As described above, according to this embodiment, power-off-1 is set as a transition condition particularly in an HDD in the idling state, in transition among the power saving states (PS0 to PS2), and in transition between the power saving states (PS1 and PS2). By this, the HDD power source ON control becomes available only when the ATA command is received (that is, when the HDD is seriously required), and therefore, power saving control which is appropriate in terms of power saving relative to the HDD and in terms of lifetime associated with the number of times power off/on is performed may be performed.

For example, the HDD is preferably powered off when being not used and powered on when being seriously required in terms of electric power and lifetime. Furthermore, a determination as to whether a current background process is to be continued when a power saving transition request is issued during the background process associated with RAID control may be appropriately made. Even in this case, according to this embodiment, a timing of power off/on of the HDD may be appropriately determined and the determination as to whether the background process is to be continued may be appropriately made.

Note that the embodiment described above is merely a concrete example of the present technique, and the technical scope of the present disclosure is not limited to the above embodiment. Specifically various modifications of the above described technique may be made without departing from the main features of the technique.

According to the embodiment, power consumption may be efficiently reduced over a lifetime of a device (an HDD, for example) relating to the number of times the device performs power off/on.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. An electronic device comprising:
   a device controller configured to control the electronic device and including one or more processors and one or more memories;
   a storage device;
   a first controller configured to communicate with the device controller and including one or more processors and one or more memories; and
   a second controller configured to communicate with the first controller and the storage device through a predetermined physical communication interface based on a predetermined communication standard, the second controller including one or more processors and one or more memories,
   wherein the electronic device makes a transition from a first power state to a second power state having a lower power consumption than the first power state,
   wherein the second power state is a state in which at least the second controller is in a power saving state corresponding to the second power state and a power of the storage device is in an off state,
   wherein the first controller causes the second controller to return from the power saving state corresponding to the second power state in response to returning of the electronic device from the second power state to the first power state, and
   wherein the second controller, having returned from the power saving state, causes the power of the storage device to make a transition from an off state to an on state, in a case where a command received from the first controller is a first command, and
   maintains the power of the storage device in the off state in a case where the command received from the first controller is a second command different from the first command.

2. The electronic device according to claim 1, wherein the predetermined physical communication interface is a serial advanced technology attachment (SATA) standard.

3. The electronic device according to claim 1,
   wherein the first controller causes the second controller to make a transition to the power saving state corresponding to the second power state in response to the electronic device making a transition to the second power state, and
   wherein the second controller having made a transition to the power saving state corresponding to the second power state causes the power of the storage device to make a transition to an off state.

4. The electronic device according to claim 3, wherein the off state of the power of the storage device caused by the second controller having made a transition to the power saving state corresponding to the second power state is either one of a first power off state and a second power off state.

5. The electronic device according to claim 1,
   wherein the first controller connects to the second controller via a first interface and the second controller connects to the storage device via a second interface,
   wherein the first controller, when the electronic device makes a transition from the first power state to the second power state, performs processing for a transition to a power saving state on the first interface, and
   wherein the second controller receives an instruction for transition to a power saving state from the first controller via the first interface, and performs processing for a transition to a power saving state on the second interface.

6. The electronic device according to claim 1, wherein the first command is an ATA command and the second command is not the ATA command.

7. The electronic device according to claim 1, wherein the first power off state is a state in which the power of the storage device makes a transition from an off state to an on state in a case where a first command is received from the first controller, and a state in which the power of the storage device is maintained in the off state in a case where a second command different from the first command is received from the first controller.

8. The electronic device according to claim 1, wherein the second power off state is a power state that causes the power of the storage device to make a transition from an on state to an off state, in a case where the first command or the second command is received from the first controller.

9. The electronic device according to claim 5, wherein the second controller stores a power state of the storage device related to a power state of the electronic device and a power state of an interface included in the second controller.

10. The electronic device according to claim 1 further comprising a printer configured to perform printing.

11. The electronic device according to claim 1,
    wherein the electronic device makes a transition to a third power state which is lower in power consumption than the first power state and higher in power consumption than the second power state, and
    wherein the third power state is a state in which at least the second controller is in a power saving state corresponding to the second power state and the power of the storage device is in the power saving state.

12. A method for controlling an electronic device including a device controller configured to control the electronic device and including one or more processors and one or more memories;
    a storage device;
    a first controller configured to communicate with the device controller and including one or more processors and one or more memories; and
    a second controller configured to communicate with the first controller and the storage device through a predetermined physical communication interface based on a predetermined communication standard, the second controller including one or more processors and one or more memories, and the method comprising:

the electronic device making a transition from a first power state to a second power state having a lower power consumption than the first power state, wherein the second power state is a state in which at least the second controller is in a power saving state corresponding to the second power state and a power of the storage device is in an off state;

the first controller causing the second controller to return from the power saving state corresponding to the second power state in response to returning of the electronic device from the second power state to the first power state; and the second controller, having returned from the power saving state, causing the power of the storage device to make a transition from an off state to an on state, in a case where a command received from the first controller is a first command, and maintaining the power of the storage device in the off state in a case where the command received from the first controller is a second command different from the first command.

* * * * *